(No Model.)  2 Sheets—Sheet 1.

J. M. SPENCER.
HAY RAKE.

No. 362,330.  Patented May 3, 1887.

WITNESSES:
C. Neveux
C. Sedgwick

INVENTOR:
J. M. Spencer
BY Munn & Co
ATTORNEYS.

(No Model.) 2 Sheets—Sheet 2.

J. M. SPENCER.
HAY RAKE.

No. 362,330. Patented May 3, 1887.

WITNESSES:
C. Neveux
C. Sedgwick

INVENTOR:
J. M. Spencer
BY Munn & Co.
ATTORNEYS.

UNITED STATES PATENT OFFICE.

JOSEPH M. SPENCER, OF LA PLATA, MISSOURI.

HAY-RAKE.

SPECIFICATION forming part of Letters Patent No. 362,330, dated May 3, 1887.

Application filed October 26, 1886. Serial No. 217,236. (No model.)

*To all whom it may concern:*

Be it known that I, JOSEPH M. SPENCER, of La Plata, in the county of Macon and State of Missouri, have invented a new and Improved Hay-Rake, of which the following is a full, clear, and exact description.

This invention relates to the construction of hay-rakes, the object of the invention being to provide a rake which shall be so constructed that it may be moved in either direction without changing the point of attachment of the horses employed to drag the rake, the parts being so arranged that in reversing the direction of travel after gathering the load the points of the rake-teeth will be automatically raised, as will be hereinafter described, and specifically pointed out in the claims.

Reference is to be had to the accompanying drawings, forming a part of this specification, in which similar figures of reference indicate corresponding parts in all the views.

Figure 1:
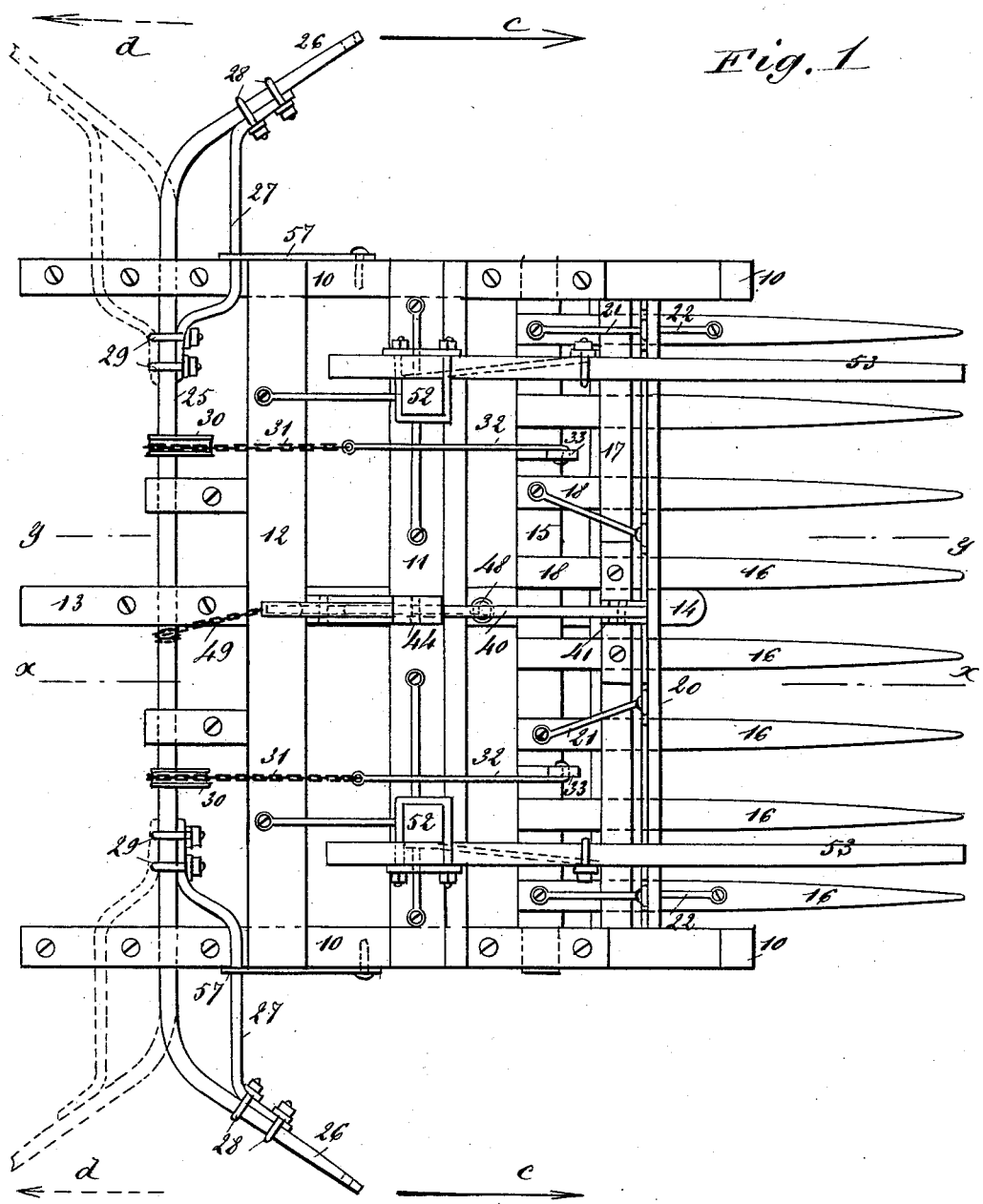
Figure 2:
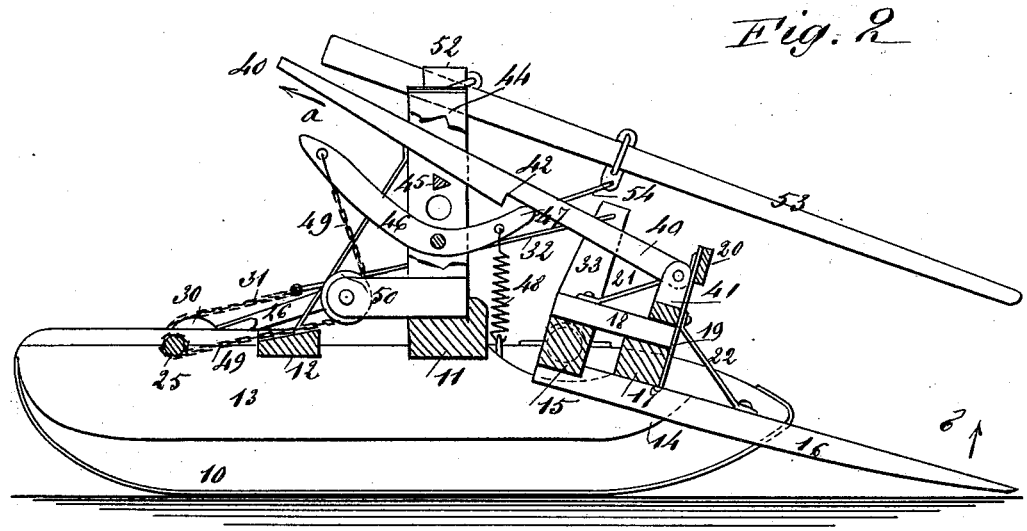
Figure 3:
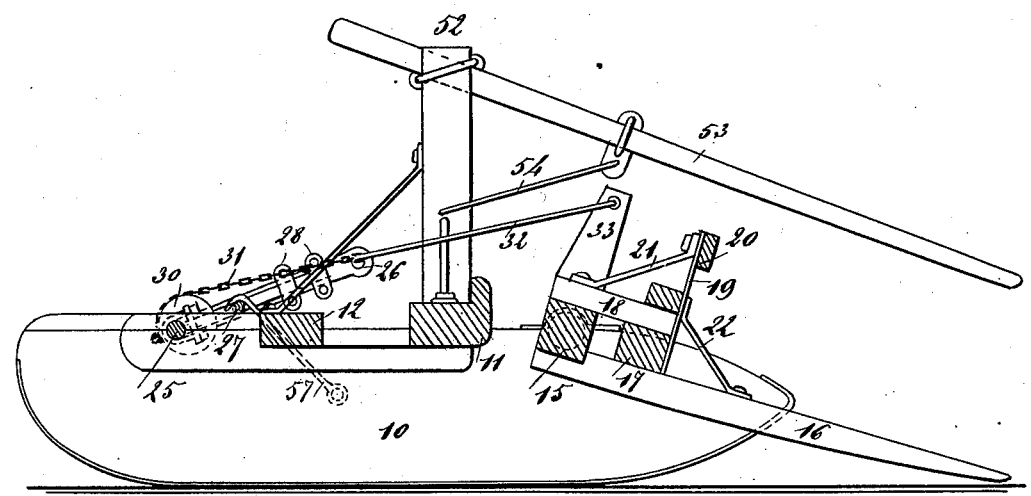

Figure 1 is a plan view of my improved form of rake. Fig. 2 is a cross sectional elevation taken on $x$ $x$ of Fig. 1, parts being broken away to show the construction; and Fig. 3 is a cross-sectional elevation taken on line $y$ $y$ of Fig. 1.

In constructing such a rake as the one illustrated in the drawings above referred to, I provide a main frame, which consists of two side runners, 10, that are rigidly connected by a heavy cross-bar, 11, and by a lighter rear cross-bar, 12, a central longitudinal strip, 13, being arranged beneath the cross-bars 11 and 12, the strip 13 being provided with a forwardly-extending end, 14, the purpose of which will be hereinafter explained.

The head of the rake proper is made up of rigidly-connected frame-work consisting of a cross-bar or axis, 15, to which the rake-teeth 16 are connected, and of a forward bracing-bar, 17, that is connected to the cross-bar 15 and to the rake-teeth, the connection between the bars 15 and 17 being established by short longitudinal strips 18.

Just in advance of the bar 17 I arrange vertical strips 19, to the upper ends of which there is secured a horizontal strip, 20, the strips 19 being supported by brace-rods 21 and 22, the rods or bars 22 also serving to impart a greater rigidity to the rake-teeth 16. The cross-bar 15, which is the axis of the rake, is formed with round ends, and journaled in bearings formed near the forward ends of the runners 10.

To the rear of the cross-bar 12 there is journaled a shaft, 25, said shaft being preferably made of heavy gas-pipe, and arranged so that it extends some distance beyond each of the runners, the extending ends of the shaft being bent forward, as indicated in the drawings. These forwardly-extending bent ends 26 are braced and supported by brace-rods 27, that are secured to the ends 26 of the shaft 25 by clips 28, and to the shaft 25 on the other side of the runner by clips 29.

The shaft 25 carries two eccentric wheels, 30, to which there are secured chains 31, said chains extending forward to connect with rods 32, that are secured to standards 33, carried by the shaft or axis of the rake-head.

A latch, 40, is pivotally connected to the rake-head, the end of the lever being mounted within a socket, 41, as best shown in Figs. 1 and 2. This latch 40, which is formed with a catch-tooth, 42, extends to the rear, passing through a centrally and vertically slotted standard, 44, in which there is arranged a stop, 45, the arrangement being such that when the latch 40 is drawn to the rear in the direction of the arrow shown in connection therewith at *a* the rake-teeth will be raised in the direction of the arrow shown at *b*, in which raised position they may be held by bringing the tooth 42 into engagement with the stop 45; but in order that the latch 40 may be automatically released, as will be hereinafter described, I mount a bell-crank lever, 46, in the central slot of the standard 44, the point 47 of the lever 46 being arranged to bear against the under face of the latch 40, but this point is normally held depressed by a spring, 48. The stop 45 is shown as a triangular bar extending across the slot of the standard; but it may be of any other shape that will hold the latch 40 when brought into engagement with it.

To the rear end of the lever 46 there is connected a chain, 49, which extends downward and under a sheave, 50, the end of the chain being secured to the shaft 25, said end passing beneath the shaft, as best shown in Fig. 2.

In addition to the standard 44, the cross-bar 11 carries two other standards, 52, to which there are secured forwardly-extending arms or fingers 53, that are braced by rods or bars 54, the fingers 53 acting to hold the load of hay upon the rake after the points of the rake-teeth have been raised, and during the time that the load is being drawn to the stack, as will be hereinafter described.

In operation, a horse is hitched to each of the arms 26, the arms at this time being in the position in which they are shown in full lines in Fig. 1, all accidental displacement of the bars when so adjusted being prevented by hooks 57, which are pivotally connected to the runners 10, and arranged so that their bent ends will engage with the brace rods or bars 27, as clearly indicated in Fig. 3. When the parts of the rake are adjusted as described, all undue depression of the points of the rake-teeth is prevented by the arrangement of the point 14 of the longitudinal strip 13, said point passing forward beneath the cross-strip 17, said strip resting upon the point. After a load has been obtained (the machine at this time advancing in the direction of the arrows shown at *c*) the teams are turned around so as to face in the direction of the arrows marked *d*, the shaft 25 at this time being moved to the position indicated by dotted lines, it being understood that the hooks 57 were previously thrown out of engagement with the bracing bars or rods 27. As the shaft 25 is moved to the position in which it is shown in dotted lines, the eccentric wheels 30 will act to raise the rake-teeth, said teeth moving in the direction of the arrow *b*, the tooth 42 of the latch 40 dropping into engagement with the stop 45, and thereby preventing any accidental falling of the rake.

As the rake-teeth are raised, as just described, the load is bound between the arms or fingers 53, and is thereby prevented from spilling or falling from the rake. Upon reaching the stack the latch 40 may be thrown up and the teeth allowed to drop to position to deliver the load, this movement being brought about by hand; or the shaft 25 may be returned to the position in which it is shown in full lines in Fig. 1, which movement of the shaft will draw down upon the chain 49 and raise the point 47 of the lever 46, which movement of said point will force the latch 40 upward and free its tooth 42 from engagement with the stop 45.

It will be noticed that after the load has been gathered and the direction of travel reversed, in order that the load may be carried to the stack, the preponderance of weight is at the rear of the machine, so that the draft is greatly decreased.

Having thus fully described my invention, I claim as new and desire to secure by Letters Patent—

1. In a hay-rake, the combination, with a main frame, of a rake journaled in the frame, a rock-shaft journaled in and projecting beyond the sides of the said frame and forming draft attachments, and intermediate mechanism between rake and rock-shaft, whereby the rake is raised and lowered by rocking the shaft, substantially as herein shown and described.

2. In a hay-rake, the combination, with a main frame and a rake journaled in the frame, of a rock-shaft journaled in and projecting beyond the sides of the frame, eccentrics on the said shaft, and connections between said eccentrics and rake, substantially as herein shown and described.

3. In a hay-rake, the combination, with a main frame and a rake journaled therein, of a rock-shaft having its ends projecting beyond the sides of the frame, eccentrics on the rock-shaft, connections between the eccentrics and rake, a stop, a latch engaging the stop for holding the rake elevated, and means for tripping the latch from the rock-shaft, substantially as herein shown and described.

4. In a hay-rake, the combination, with a main frame, a rake journaled therein, and fingers or arms projecting over the rake, of a rock-shaft having its ends projecting beyond the sides of the frame, and intermediate mechanism between the rock-shaft and rake, whereby the rake is raised and lowered by rocking the shaft, substantially as herein shown and described.

5. In a hay-rake, the combination, with a main frame, a rake journaled therein, and fingers or arms projecting over the rake, of a rock-shaft having its ends bent and projecting beyond the sides of the frame, eccentrics on the shaft, connections between the eccentrics and rake, a latch pivoted to the rake and engaging a stop on the frame, a bell-crank lever pivoted to a support on the frame and adapted to engage said latch, and a chain connected to said bell-crank lever and rock-shaft, substantially as herein shown and described.

6. In a hay-rake, the combination, with a main frame and a rake journaled therein, of a rock-shaft having its inner ends bent and projecting beyond the sides of the frame, braces secured to the bent ends and to the body of the rock-shaft, hooks engaging said braces to lock the shaft in position, and intermediate mechanism between the said shaft and rake for operating the latter from the former, substantially as herein shown and described.

7. In a hay-rake, the combination, with a main frame, of a rake journaled therein, a latch, 40, pivotally connected to the rake and formed with a tooth, 42, a centrally-slotted standard, 44, having a slot, 45, a bell-crank lever, 46, arranged to bear against the under side of the latch 40, and a chain connected to the lever 46, and also connected to a shaft, 25, that is journaled on the main frame of the machine, substantially as described.

JOSEPH M. SPENCER.

Witnesses:
J. S. ELMORE,
S. R. SPENCER.